No. 11,892. Reissued Feb. 26, 1901.
E. M. HALLBAUER.
CAN.
(Application filed Feb. 17, 1899.)
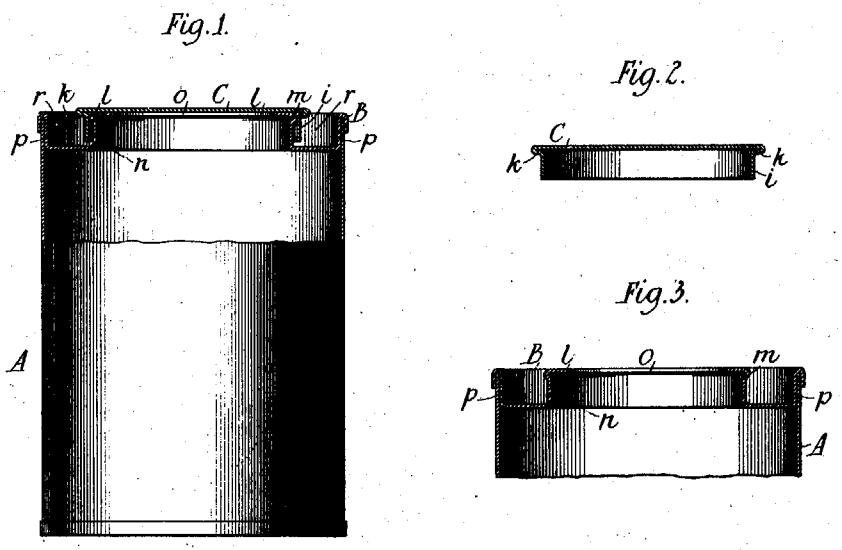
Witnesses
J. K. Geckey,
H. J. Norton.
Inventor
Ernst Moritz Hallbauer
By Dyrenforth & Dyrenforth,
his Attorneys

UNITED STATES PATENT OFFICE.

ERNST MORITZ HALLBAUER, OF CHICAGO, ILLINOIS, ASSIGNOR TO ILLINOIS CAN CO., OF SAME PLACE.

CAN.

SPECIFICATION forming part of Reissued Letters Patent No. 11,892, dated February 26, 1901.

Original No. 603,817, dated May 10, 1898. Application for reissue filed February 17, 1899. Serial No. 705,911.

*To all whom it may concern:*

Be it known that I, ERNST MORITZ HALLBAUER, a citizen of the United States, residing at Chicago, county of Cook, and State of Illinois, have invented certain new and useful Improvements in Cans; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to an improvement in the class of cans which are commonly formed of sheet metal and are adapted to hold liquids by rendering-liquid tight their closure through the medium of their covers.

My invention relates particularly to the construction of that portion of the can having the opening therein through which access is obtained to the interior thereof and to the cover for such opening; and my object is to provide a simple but novel construction which shall not only accomplish the desired object of rendering the can-closure perfectly liquid-tight, but produce such tightness of closure by a very small extent of contact-surface between the engaging portions of the can and cover, so that such engaging portions may be readily formed with sufficient evenness to avoid air-spaces by insuring perfect contact and also that the cover may be removed with ease.

Referring to the accompanying drawings, Figure 1 is a view in elevation, partly in section, of a can and cover embodying my invention. Fig. 2 is a cross-sectional view of the cover, showing its preferred construction; and Fig. 3 is a similar broken view showing the preferred construction of the can-body.

A is the body of the can, which may be of circular cross-section, as shown, or of other form.

B is the can-head, fastened about the top edge of the can and formed with the gutter-like depression $r$ between sides $p$ and $n$, the latter extending about the opening $o$ in the can-head and forming a wall $n$. Toward the upper edge of this wall is formed an outwardly-projecting portion $m$, from which there extends inwardly about the opening $o$ an annular reinforcing-flange $l$. The projection $m$ may, however, be formed lower down on the wall $n$ than shown, if desired.

C is the cover, which I prefer to form out of a single piece of sheet metal by crimping it to produce a shoulder $k$, and extending therefrom is a smooth or uncorrugated flange $i$ of a diameter to adapt it to fit tightly over the projection $m$ about the wall $n$.

To apply the cover C, it is pressed at its flange $i$ over the wall $n$ and should be forced on till the projection $m$ coincides with the inner end of the inturned portion forming the shoulder $k$. It is not, however, essential that there shall ensue this coincidence, inasmuch as the inner surface of the cover-flange will engage the projection at any point along the flange and produce the sealing function. Thus the frictional contact between the cover and wall is produced about practically a mere line of surface, which may be readily formed in making the can, so that contact and consequent tight closure may be assured at every point. The inturned flange $l$ adequately reinforces the projection $m$ to resist any tendency to bend, and thus deflect it by the strain of the tight-fitting cover-flange $i$, and as a particularly important advantage of my improved construction the cover, however tight its fit or lodgment, may be easily removed by prizing it at any point of the free edge of the shoulder $k$, owing to the narrowness of contact-surface thereof with the projection $m$ to be overcome, which acts along a portion of the opposite side of the can to which the strain of prizing is applied and after the cover has been started in the nature of a fulcrum upon which to turn the cover-flange inward into the externally-recessed portion of the wall $n$ below the projection $m$.

While I have shown the body of the can as circular in cross-section, the same may, as before stated, be of other form, as rectangular, and the opening therein and its cover may be circular in cross-section or of other form, as may be preferred.

I claim as my invention—

1. In a vessel, the combination with the vessel-body having an opening therein and a wall about the opening surrounded by a channel or trough, said wall having an outwardly-projecting portion toward its top, of a cover having an inturned portion and a flange depending from the inturned portion, said flange adapted to project within said channel or trough and to contact at a mere line of surface with the outwardly-projecting portion of the wall of the opening.

2. In a vessel, the combination with the top thereof having an opening therein and a wall surrounding such opening and provided with an outwardly-extending projection, of a cover having a flange provided with an inwardly-extending bend or contraction, and a flange depending from said inwardly-extending bend or contraction, said flange adapted to engage the outwardly-projecting portion of the wall of the opening in a single horizontal plane when the parts are assembled.

3. In a vessel, the combination with the top thereof having an opening therein, the wall of said opening being surrounded by a channel or trough, and said wall having an outward-projecting portion adjacent to its upper end, of a cover having a spring-flange provided with an inward bend or contraction, terminating in a downwardly-depending flange projecting within said channel or trough, the said inwardly-bent portion of said cover-flange being in contact with said outward-projecting portion of the wall of said opening on a single horizontal plane.

4. A can having the head B formed with a circumferential depression *r* and a nozzle about the opening, said nozzle having an outward-projecting bead *m* presenting to the inner surface of the cover-flange, for engagement therewith, practically a mere circumferential line, substantially as and for the purpose set forth.

5. A can having the head B formed with a circumferential depression *r* and a nozzle about the opening, said nozzle having an outward-projecting bead *m* presenting to the inner surface of the cover-flange, for engagement therewith, practically a mere circumferential line, and provided with an inturned reinforcing-flange *l*, substantially as and for the purpose set forth.

6. In a can, the combination with the can-body of a head formed with a circumferential depression *r* and a nozzle about the opening, said nozzle having an outward-projecting circumferential bead *m* presenting about its greater circumference practically a mere line, and a cover C having the shoulder *k* and flange *i* to surround said nozzle and engage with said bead, substantially as and for the purpose set forth.

7. In a can, the combination with the can-body of a head formed with a circumferential depression *r* and a nozzle *n* about the opening, said nozzle having an outward-projecting bead *m* about its edge, presenting about its greater circumference practically a mere line and an inturned reinforcing-flange *l* on said nozzle, and a cover C having the shoulder *k* and flange *i* to surround said nozzle and engage with said bead at the inturned end of said shoulder, substantially as and for the purpose set forth.

In testimony whereof I affix my signature in the presence of two witnesses.

ERNST MORITZ HALLBAUER.

Witnesses:
R. T. SPENCER,
D. W. LEE.